US008601269B2

(12) United States Patent
Batra et al.

(10) Patent No.: US 8,601,269 B2
(45) Date of Patent: Dec. 3, 2013

(54) METHODS AND SYSTEMS FOR CLOSE PROXIMITY WIRELESS COMMUNICATIONS

(75) Inventors: Anuj Batra, Dallas, TX (US); Srinivas Lingam, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1874 days.

(21) Appl. No.: 11/426,227

(22) Filed: Jun. 23, 2006

(65) Prior Publication Data

US 2007/0014409 A1    Jan. 18, 2007

Related U.S. Application Data

(60) Provisional application No. 60/706,170, filed on Aug. 5, 2005, provisional application No. 60/699,776, filed on Jul. 15, 2005.

(51) Int. Cl.
G06F 21/00 (2013.01)
(52) U.S. Cl.
USPC .......... 713/171; 726/23; 726/11; 455/41; 455/411; 380/277; 380/270; 713/169
(58) Field of Classification Search
USPC ........................................ 713/171
See application file for complete search history.

(56) References Cited

U.S. PATENT DOCUMENTS

| 6,449,246 | B1 * | 9/2002 | Barton et al. | 370/210 |
|---|---|---|---|---|
| 6,931,291 | B1 * | 8/2005 | Alvarez-Tinoco et al. | 700/94 |
| 7,039,392 | B2 | 5/2006 | McCorkle et al. | |
| 7,058,414 | B1 * | 6/2006 | Rofheart et al. | 455/456.4 |
| 7,120,166 | B2 * | 10/2006 | McFarland et al. | 370/480 |
| 7,263,130 | B1 * | 8/2007 | Mitlin | 375/260 |
| 7,286,603 | B2 * | 10/2007 | Varshney et al. | 375/260 |
| 7,400,891 | B2 * | 7/2008 | Aaron | 455/456.4 |
| 2002/0016153 | A1 * | 2/2002 | Sato et al. | 455/41 |
| 2002/0114270 | A1 * | 8/2002 | Pierzga et al. | 370/208 |
| 2003/0050009 | A1 | 3/2003 | Kurisko et al. | |
| 2003/0123384 | A1 * | 7/2003 | Agee | 370/208 |
| 2004/0008617 | A1 * | 1/2004 | Dabak et al. | 370/208 |
| 2004/0076300 | A1 | 4/2004 | Ishidoshiro | |
| 2004/0141548 | A1 * | 7/2004 | Shattil | 375/146 |

(Continued)

FOREIGN PATENT DOCUMENTS

EP    1178697 A2    2/2002

OTHER PUBLICATIONS

Introduction to Physical Layer Specifications of MB-OFDM UWB Proposal|URL:http://wise.cm.nctu.edu.tw/wise_lab/course/Seminar/Download%20files/MB_OFDM_UWB.pdf|Sep. 22, 2004.*

(Continued)

Primary Examiner — Mahfuzur Rahman
(74) Attorney, Agent, or Firm — Steven A. Shaw; W. James Brady; Frederick J. Telecky, Jr.

(57) ABSTRACT

A system is provided that includes a first device and a second device. The second device is configured to communicate wirelessly with the first device. The first and second devices selectively reduce an operational range for communications before sharing a secret, the secret related to data encryption.

6 Claims, 3 Drawing Sheets

(56) References Cited

U.S. PATENT DOCUMENTS

| | | | |
|---|---|---|---|
| 2004/0203600 A1* | 10/2004 | McCorkle et al. | 455/411 |
| 2004/0223553 A1* | 11/2004 | Kumar | 375/259 |
| 2005/0069020 A1* | 3/2005 | Lakkis | 375/130 |
| 2005/0090267 A1* | 4/2005 | Kotzin | 455/456.4 |
| 2005/0201315 A1* | 9/2005 | Lakkis | 370/315 |
| 2006/0056534 A1* | 3/2006 | Ionescu et al. | 375/267 |
| 2009/0259915 A1* | 10/2009 | Livshitz et al. | 714/758 |

OTHER PUBLICATIONS

MultiBand OFDM Physical Layer Proposal for IEEE 802.15 Task Group3a|URL:www.multibandofdm.org/.../MultiBandOFDM_Physical_Layer_Proposal_for_IEEE_802.15.3a_Sept_04.pdf|Sep. 14, 2004.*

Bypass Decoding: A Reduced-Complexity Decoding Technique for LDPC-Coded MIMO-OFDM Systems|http://paros.stanford.edu/~jiang/data/bypass_vt08.pdf|2008|Xin et al.|pp. 2319-2333.*

* cited by examiner

METHODS AND SYSTEMS FOR CLOSE PROXIMITY WIRELESS COMMUNICATIONS

CROSS-REFERENCE TO RELATED APPLICATIONS

This application is a non-provisional application claiming priority to U.S. Provisional Pat. App. No. 60/706,170, entitled "Close Proximity Communications Using Multi-Band OFDM", filed on Aug. 5, 2005, and U.S. Provisional Pat. App. No. 60/699,776, entitled "Close Proximity Communications Using Multi-Band OFDM", filed on Jul. 15, 2005, both of which are incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to communication systems, and more particularly, but not by way of limitation, to communication systems where devices encrypt/decrypt data to enhance the security of communications between the devices.

BACKGROUND

In order for electronic devices to communicate, a wireless or wired protocol (i.e., standard) defines hardware and software parameters that enable the devices to send, receive, and interpret data. The Federal Communications Commission (FCC) has allocated different frequency ranges (spectrums) for different wireless protocols. For example, the 802.11(a) protocol provided by the Institute of Electrical and Electronics Engineers (IEEE) specifies operating in a frequency range from 4.9-5.85 GHz (part of the Unlicensed National Information Infrastructure (U-NII) band). Also, the Worldwide Interoperability of Microwave Access (WiMAX) protocol specifies operating in frequency range from 3.3-3.8 GHz and from 5.4-5.825 GHz. More recently, the Ultra Wideband (UWB) protocol specifies operating in a frequency range from 3.1-10.6 GHz. The UWB protocol is based on Multi-band Orthogonal Frequency Division Multiplexing (OFDM) and is defined by the ECMA-368 specification provided by the WiMedia Alliance.

At least one application of UWB involves Wireless Universal Serial Bus (WUSB) devices (e.g., printers, scanners, external hard drives, digital cameras or other devices) that communicate with a host system. To improve the security of communications between a WUSB device and the host system, a data encryption/decryption scheme can be implemented. In a data encryption/decryption scheme, the WUSB device and the host device share a secret (e.g., a security key) that is used to encrypt data at one device and decrypt data at the other device. If the secret becomes known to other entities, the security of communications between the WUSB and the host system can be compromised. Accordingly, methods and systems that protect the integrity of the secret are desirable.

SUMMARY

In at least some embodiments, a system is provided that includes a first device and a second device. The second device is configured to communicate wirelessly with the first device. The first and second devices selectively reduce an operational range for communications before sharing a secret.

In other embodiments, a transmitter is provided that includes close proximity transmission mode logic and extended proximity transmission mode logic. The close proximity transmission mode logic selectively reduces a transmission range before transmitting an encryption key.

In still other embodiments, a receiver is provided that includes close proximity communication mode logic and extended proximity communication mode logic. The close proximity communication mode logic selectively bypasses a receiver component during a close proximity communication mode.

In at least some embodiments, a method is provided that includes reducing an operational range for communications between two devices. The method further comprises sharing a secret between the two devices while the operational range for communications is reduced.

BRIEF DESCRIPTION OF THE DRAWINGS

For a detailed description of various embodiments of the invention, reference will now be made to the accompanying drawings in which:

FIG. 4 illustrates a method in accordance with embodiments of the disclosure.

NOTATION AND NOMENCLATURE

Figure 1:
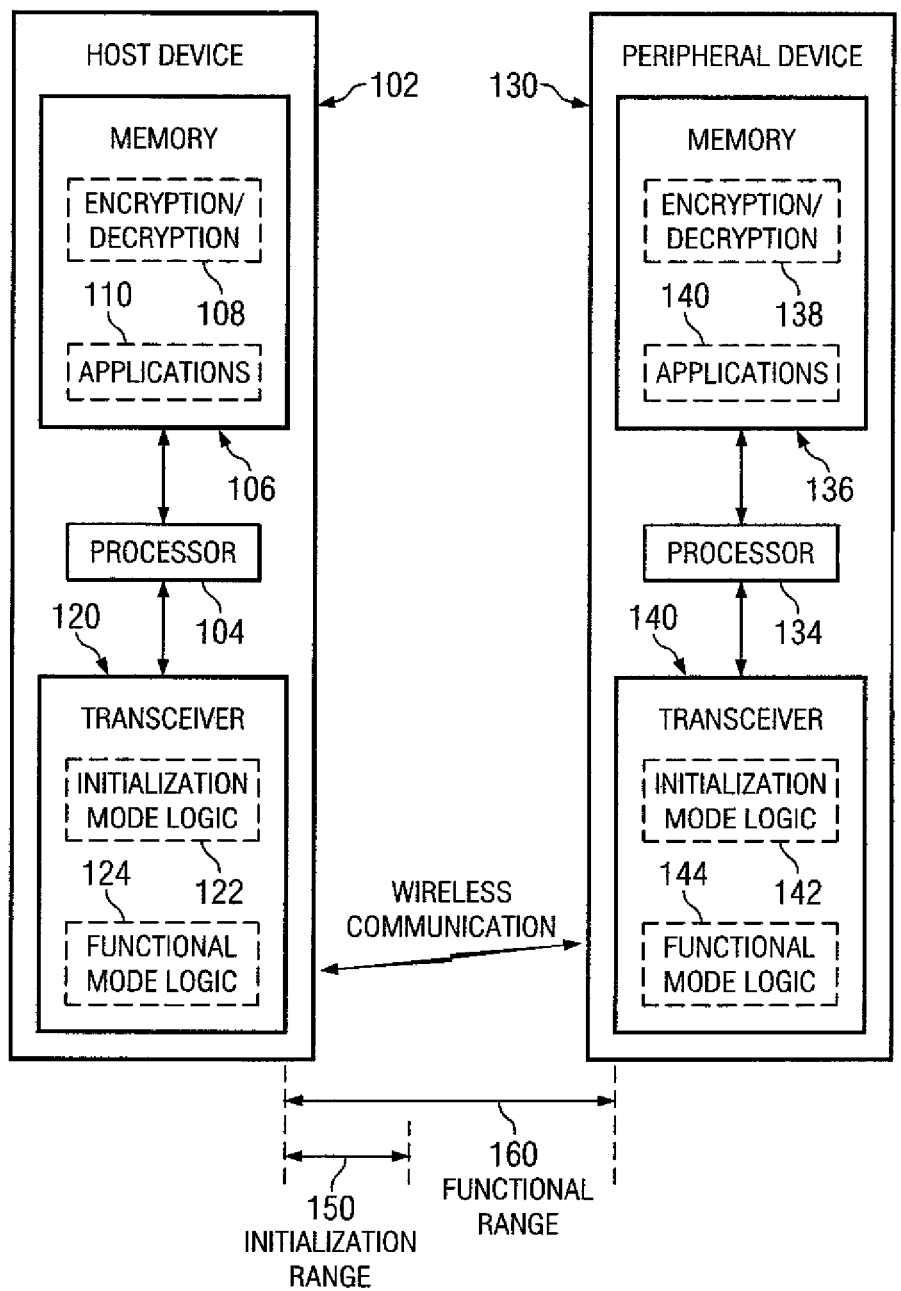
FIG. 1 illustrates a system in accordance with embodiments of the disclosure.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

Electronic devices that communicate wirelessly (or via a wired connection) implement a variety of techniques to prepare, send, receive, and recover data. For example, data preparation techniques may include data scrambling, error correction coding, interleaving, data packet formatting, and/or other techniques. The data to be transmitted is converted into blocks of data (i.e., bits) transmitted as information symbols. Each information symbol is associated with a constellation of complex amplitudes.

If data communication is wireless, one or more antennas "pick up" the wireless signal, after which data is recovered by sampling the received signal and decoding each information symbol. To recover data, a receiving device may implement techniques such as signal amplification, digitization, sample rate conversion, equalization, demodulation, de-interleaving, de-coding, and/or de-scrambling.

In some communication systems an encryption/decryption scheme is implemented to enhance the security of communications between a transmitting device and a receiving device. Encryption/decryption schemes can be based on a secret, such as but not limited to, a security key shared by the transmitting device and the receiving device. The secret used for or related to data encryption. Embodiments of the disclosure illustrate methods and systems that protect the integrity of the secret used for encryption/decryption. Alternatively, the methods and system could protect the integrity of any type of data transmitted between two devices. In other words, the protected data does not have to be limited to a secret or security key used for encryption/decryption.

Embodiments such as those disclosed herein protect the integrity of data transferred between two devices by selectively limiting communications to within a close proximity (e.g., 5-10 cm). In at least some embodiments, a host device and a peripheral device are configured for wireless communication based on the Ultra Wideband (UWB) protocol. During an initialization mode, the transceivers of the host device and the peripheral device are configured such that communication is only possible within a limited range (i.e., communication is only possible if the devices are in close proximity to each other). For example, the initialization mode can be used to securely exchange a secret between the host device and the peripheral device.

After the initialization mode is complete, the host device and the peripheral device can enter a functional mode where the transceivers of the host device and the peripheral device enable communications within an extended range (i.e., communication is possible with the devices being outside of the limited range). In at least some embodiments, communications during the functional mode are protected (e.g., via encryption/decryption) using the secret that was shared between the devices during in the initialization mode.

FIG. 1 illustrates a system 100 in accordance with embodiments of the disclosure. As shown in FIG. 1, the system 100 comprises a host device 102 in communication with a peripheral device 130. The host device 102 may comprise, for example, a server, a desktop computer, a laptop computer, a vending machine, a kiosk, or a mobile device. The peripheral device 130 may comprise, for example, a printer, a scanner, a digital camera, a smartcard reader, a biometric reader, a Personal Digital Assistant (PDA), a cellular phone, portable or other storage devices, or some other peripheral device. In at least some embodiments, the host device 102 represents another peripheral device.

As shown, the host device 102 and the peripheral device 130 communicate wirelessly. For example, in some embodiments, the host device 102 and the peripheral device 130 communicate using the UWB protocol. While embodiments illustrated herein are based on the UWB protocol, the host device 102 and the peripheral device 130 are not limited to communicating using the UWB protocol and could communicate wirelessly using another protocol now known or later developed.

As shown, the host device 102 comprises a processor 104 coupled to a memory 106 and a transceiver 120. The memory 106 stores applications 110 and encryption/decryption instructions 108 for execution by the processor 104. If the host device 102 is a computer, the applications 110 could comprise any known or future applications useful for individuals or organizations. As an example, such applications 110 could be categorized as operating systems, device drivers, databases, presentation tools, emailers, file browsers, firewalls, instant messaging, finance tools, games, word processors or other categories. Regardless of the exact nature of the applications 110, at least some of the applications 110 are involved in communications between the host device 102 and the peripheral device 130.

To enhance the security of communications between the host device 102 and the peripheral device 130, the encryption/decryption instructions 108 are implemented. In the case of data encryption, the encryption/decryption instructions 108 direct the processor 104 to encrypt data based on a secret. The secret could be a key that is generated randomly or could be input by a user of the host device 102 (e.g., a user could input a password or biometric reading). After successful encryption, the encrypted data could be transmitted to the peripheral device 130 or stored for later use by the host device 102. In the case of data decryption, the encryption/decryption instructions 108 direct the processor 104 to decrypt data based on the same secret that was used to encrypt the data. If the secret is not available, data decryption fails.

In at least some embodiments, data from the host device 102 is transmitted to the peripheral device 130 via the transceiver 120. In accordance with the UWB protocol, the transceiver 120 could have a PHY layer and a data link layer which are not shown for convenience. The PHY layer and the data link layer perform several functions such as preparing, transmitting, receiving, and decoding wireless signals. In at least some embodiments, the transceiver 120 implements a modulation technique such as Multi-band Orthogonal Frequency Division Multiplexing (Multi-band OFDM).

As shown, the transceiver 120 comprises initialization mode logic 122 and functional mode logic 124. The initialization mode logic 122 causes the transceiver 120 to operate in an initialization mode that limits wireless communications between the host device 102 and other devices to within an initialization range 150. The initialization range 150 may be between 5-10 cm although other ranges are possible.

To limit the initialization range 150 when the host device 102 is transmitting data, the initialization mode logic 122 may adjust the transceiver's transmission power level, data transfer rate, error correction encoding, interleaving, or zero-padded suffix content. For example, the initialization range 150 could be minimized based on reducing the transmission power level, increasing the data transfer rate, bypassing error correction encoding, bypassing interleaving and inserting random data into zero-padded suffixes prepared by the transceiver 120.

To limit the initialization range 150 when the host device 102 is receiving data, the initialization mode logic 122 may adjust the transceivers low-noise amplification, de-interleaving, error correction decoding, or overlap-and-add operations. For example, the initialization range 150 could be minimized based on selecting low-noise amplification with a poor noise factor, bypassing de-interleaving, bypassing error correction decoding, or disabling overlap-and-add operations.

One potential purpose for the limited initialization range 150 is to enable the host device 102 and another device (e.g., the peripheral device 130) to securely exchange data. For example, the host device 102 and the peripheral device 130 may exchange a secret that is later the basis for secure communications (e.g., data encryption/decryption) between the host device 102 and the peripheral device 130. By limiting the initialization range 150 appropriately, maleficent entities are unlikely to capture the secret exchanged during the initialization mode (at least not without a user of the host device 102 noticing) since the entities would have to be in very close proximity. Accordingly, a presumably secure communication session between the host device 102 and the peripheral device 130 can be established based on the secret.

The functional mode logic 124 causes the transceiver 120 to operate in a functional mode that extends wireless communications between the host device 102 and other devices (e.g., the peripheral device 130) to a functional range 160. In some embodiments, the functional range 160 may be up to 10 meters although other ranges are possible.

To extend the functional range 160 when the host device 102 is transmitting data, the functional mode logic 124 may adjust a transceivers transmission power level, data transfer rate, error correction encoding, interleaving, or zero-padded suffix content. For example, the functional range 160 could be maximized based on increasing the transmission power level, decreasing the data transfer rate, using error correction encoding, using interleaving, and inserting zeros into zero-padded suffixes prepared by the transceiver 120.

To extend the functional range 160 when the host device 102 is receiving data, the functional mode logic 124 may adjust the transceiver's low-noise amplification, de-interleaving, error correction decoding or overlap-and-add operations. For example, the functional range 160 could be maximized based on selecting low-noise amplification with a good noise factor, using de-interleaving, using error correction decoding and enabling overlap-and-add operations.

The purpose of the functional range 160 is to enable the host device 102 and another device (e.g., the peripheral device 130) to communicate within an extended range (within a home, office, or public location). In at least some embodiments, communications in the functional mode are encrypted/decrypted using the secret that was exchanged in the initialization mode.

As shown in FIG. 1, the peripheral device 130 comprises a processor 134 coupled to a memory 136 and a transceiver 140. The memory 136 stores applications 140 and encryption/decryption instructions 138 for execution by the processor 134. The applications 140 could comprise any known or future applications related to operations of the peripheral device 134. Regardless of the exact nature of the applications 140, at least some of the applications 140 are involved in communications between the host device 102 and the peripheral device 130.

To enhance the security of communications between the host device 102 and the peripheral device 130, the encryption/decryption instructions 138 are implemented. In the case of data encryption, the encryption/decryption instructions 138 direct the processor 134 to encrypt data based on a secret. As previously mentioned, the secret could be generated randomly or could be input by a user of the host device 102 (e.g., a user could input a password or biometric reading). If the secret is generated by or input to the host device 102, the secret can be transferred to the peripheral device 130 during the initialization mode. Once the secret is successfully transferred to the peripheral device 130, the secret can be used for data encryption/decryption. Data encrypted using the secret could be transmitted to the host device 102 or stored for later use by the peripheral device 130. In the case of data decryption, the encryption/decryption instructions 138 direct the processor 134 to decrypt data based on the same secret that was used to encrypt the data. If the secret is not available, data decryption fails.

In at least some embodiments, data from the peripheral device 130 is transmitted to the host device 102 via the transceiver 140. Similar to the transceiver 120 of the host device 102, the transceiver 140 may operate in accordance with the UWB protocol and may have a PHY layer and a data link layer which are not shown for convenience. The PHY layer and the data link layer perform several functions such as preparing, transmitting, receiving, and decoding wireless signals. In at least some embodiments, the transceiver 140 implements a modulation technique such as Multi-band Orthogonal Frequency Division Multiplexing (Multi-band OFDM).

As shown, the transceiver 140 comprises initialization mode logic 142 and functional mode logic 144. The initialization mode logic 142 causes the transceiver 140 to operate in an initialization mode that limits wireless communications between the peripheral device 130 and other devices to within an initialization range 150. As previously mentioned, the host device's transceiver 120 can also operate in an initialization mode. Accordingly, the initialization range 150 can be affected by the initialization mode logic 122 of the host device 102, the initialization mode logic 142 of the peripheral device 130, or both. Again, the initialization range 150 may be between 5-10 cm although other ranges are possible. Likewise, the functional range 160 can be affected by the functional mode logic 124 of the host device 102, the functional mode logic 144 of the peripheral device 130, or both. Again, the functional range 160 may be up to 10 meters although other ranges are possible.

To limit the initialization range 150 when the peripheral device 130 is transmitting data, the initialization mode logic 142 may adjust the transceivers transmission power level, data transfer rate, error correction encoding, interleaving, or zero-padded suffix content. For example, the initialization range 150 could be minimized based on reducing the transmission power level, increasing the data transfer rate, bypassing error correction encoding, bypassing interleaving, and inserting random data into zero-padded suffixes prepared by the transceiver 140.

To limit the initialization range 150 when the peripheral device 130 is receiving data, the initialization mode logic 142 may adjust the transceiver's low-noise amplification, de-interleaving, error correction decoding, or overlap-and-add operations. For example, the initialization range 150 could be minimized based on selecting low-noise amplification with a poor noise factor, bypassing de-interleaving, bypassing error correction decoding and disabling overlap-and-add operations.

The functional mode logic 144 causes the transceiver 140 to operate in a functional mode that extends wireless communications between the peripheral device 130 and other devices (e.g., the host device 102) to a functional range 160. In some embodiments, the functional range 160 may be up to 10 meters although other ranges are possible.

To extend the functional range 160 when the peripheral device 130 is transmitting data, the functional mode logic 144 may adjust the transceiver's transmission power level, data transfer rate, error correction encoding, interleaving, or zero-padded suffix content. For example, the functional range 160 could be maximized based on increasing the transmission power level, decreasing the data transfer rate, using error correction encoding, using interleaving and inserting zeros into zero-padded suffixes prepared by the transceiver 140.

To extend the functional range 160 when the peripheral device 130 is receiving data, the functional mode logic 144 may adjust the transceiver's low-noise amplification, de-interleaving, error correction decoding or overlap-and-add operations. For example, the functional range 160 could be maximized based on selecting low-noise amplification with a good noise factor, using de-interleaving, using error correction decoding and enabling the overlap-and-add operations.

In at least some embodiments, other peripheral devices (in addition to the peripheral device 130) could be associated with and communicate with the host device 102. In such case, each peripheral device could exchange a secret with the host device 102 during separate initialization modes. Each initialization mode would involve placing a corresponding peripheral device within the initialization range 150 as described previously. The secret for each peripheral device enables secure communications (e.g., data encryption/decryption) between the host device 102 and the peripheral devices. To organize secure communications with multiple peripheral devices, the host device 102 may store a table (or other data format) that tracks which peripheral devices have been associated with the host device 102 as well as any secrets corresponding to each peripheral device.

If the host device 102 needs to transmit data to a particular peripheral device, the host device 102 identifies the particular peripheral device and/or identifies the secret that corresponds to the particular peripheral device (e.g., by searching the table). The host device 102 can then encrypt data using the secret that corresponds to that particular peripheral device and transmit the encrypted data. Presumably, only the intended recipient of the encrypted data is able to decrypt the data. When the host device 102 receives encrypted data from the peripheral devices, the host device 102 identifies the source of the encrypted data and/or identifies the secret needed to decrypt the data (e.g. by searching the table). If the host device 102 receives encrypted data and is unable to identify a corresponding peripheral device and/or a corresponding secret, the host device is unable to decrypt the encrypted data.

Figure 2:
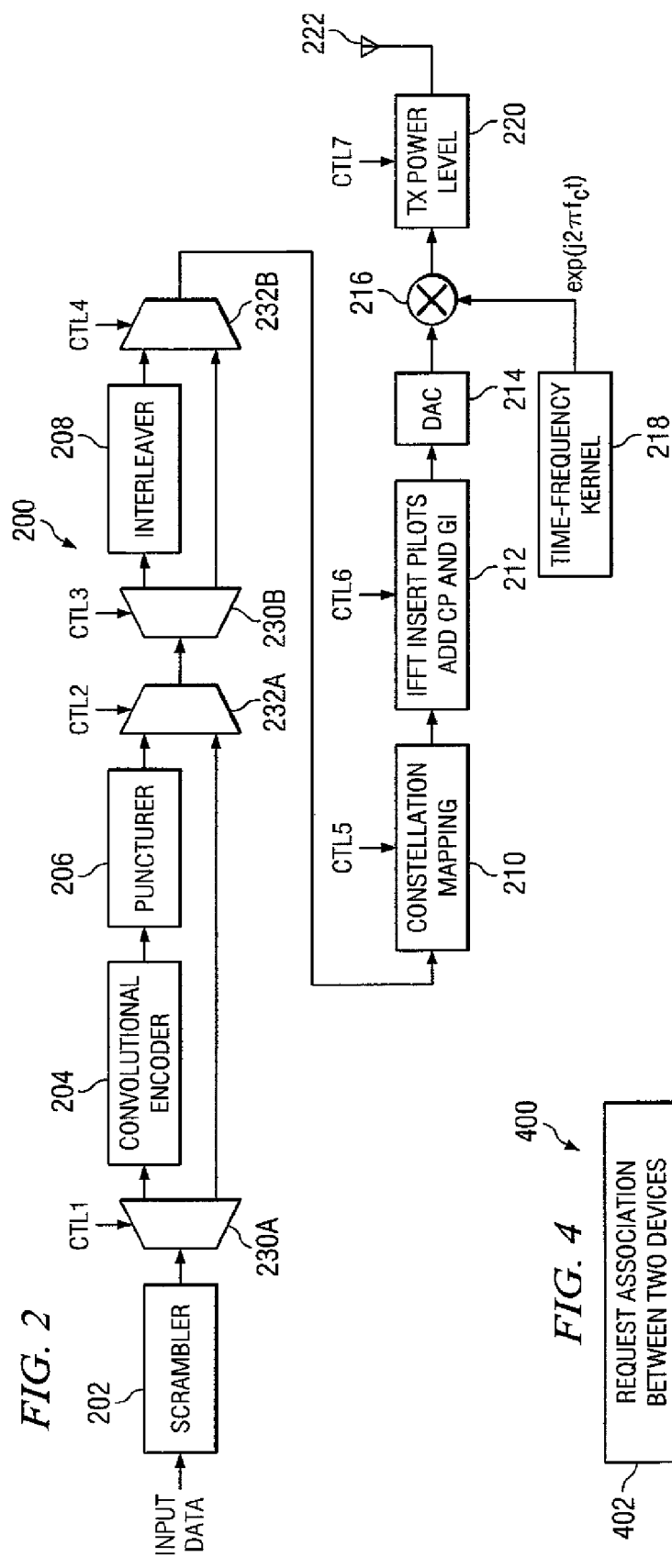
FIG. 2 illustrates a block diagram of a transmitter in accordance with embodiments of the disclosure.

FIG. 2 illustrates a transmitter 200 in accordance with embodiments of the disclosure. The transmitter 200 can be implemented, for example, by the transceivers described previously for the host device 102 and the peripheral device 130. As shown in FIG. 2, the transmitter 200 comprises a scrambler block 202 that receives input data. If the device implementing the transmitter 200 is operating in the initialization mode as previously described, the input data may comprise a secret to be exchanged between a host device and a peripheral device. If the device implementing the transmitter 200 is operating in the functional mode as previously described, the input data may comprise data that has been encrypted using a secret exchanged during the initialization mode.

The scrambler block 202 outputs scrambled data to a multiplexer ("mux") 230A which either forwards the scrambled data to a convolutional encoder block 204 and a puncturer block 206 or bypasses the convolutional encoder block 204 and the puncturer block 206. The convolutional encoder block 204 and the puncturer block 206 provide error correction encoding for the transmitter 200. Another mux 232A receives the output of the mux 230A and the output of the puncturer block 206 and forwards one of these outputs. Accordingly, the error correction encoding provided by the convolutional encoder block 204 and the puncturer block 206 can be selectively bypassed based on the control signals ("CTL1" and "CTL2") for the muxes 230A and 232A. In at least some embodiments, the CTL1 and CTL2 signals direct the muxes 230A and 232A to bypass the convolutional encoder block 204 and the puncturer block 206 during an initialization mode of a host device or a peripheral device that implements the transmitter 200. Also, the CTL1 and CTL2 signals may direct the muxes 230A and 232A to utilize the convolutional encoder block 204 and the puncturer block 206: during a functional mode of a host device or a peripheral device that implements the transmitter 200.

As shown, another mux 230B receives the output from the mux 232A. The mux 230B either forwards data to an interleaver block 208 or bypasses the interleaver block 208. In at least some embodiments, the interleaver block 208 comprises a six symbol OFDM interleaver although other interleavers could be used. Another mux 232B receives the output from the mux 230B and the output from the interleaver block 208 and forwards one of these outputs. Accordingly, the interleaving provided by the interleaver block 208 ran be selectively bypassed based on the control signals ("CTL3" and "CTL4") for the muxes 230B and 232B. In at least some embodiments, the CTL3 and CTL4 signals direct the muxes 230B and 232B to bypass the interleaver block 208 during an initialization mode of a host device or a peripheral device that implements the transmitter 200. Also, the CTL3 and CTL4 signals may direct the muxes 230B and 232B to utilize the interleaver block 208 during a functional mode of a host device or a peripheral device that implements the transmitter 200.

The output of the mux 232B is provided to a constellation mapping block 210 which converts bits into complex constellation points. In at least some embodiments the data transfer rate of the transmitter 200 can be controlled by adjusting the number of tones per bit that the constellation mapping block 210 will map. As shown, a control signal ("CTL5") is provided to the constellation mapping block 210 for selecting the number of tones per bit. In at least some embodiments, the CTL5 signal directs the constellation mapping block 210 to map one tone per bit during an initialization mode of a host device or a peripheral device that implements the transmitter 200. Also, the CTL5 signal may direct the constellation mapping block 210 to map two or more tones per bit during a functional mode of a host device or a peripheral device that implements the transmitter 200. Stated another way, the control signal CTL5 may direct the constellation mapping block 210 to increase the data transfer rate during the initialization mode and to decrease the data transfer rate during the functional mode.

The data transfer rate of the transmitter 200 could also be affected by implementing different puncturer blocks (in addition to the puncturer block 206). The different puncterer blocks could be bypassed or selected using muxes controlled by control signals. In such embodiments, the control signals could direct the muxes to select a puncturer that increases the data transfer rate during the initialization mode of a host device or a peripheral device that implements the transmitter 200. Also, the control signals could direct the muxes to select a puncturer that decreases the data transfer rate during the functional mode of a host device or a peripheral device that implements the transmitter 200.

The data transfer rate could also be affected based on time-domain spreading and frequency-domain spreading which may, for example, be implemented between the interleaver block 208 and the constellation mapping block 210. In time-domain spreading, each symbol is effectively transmitted twice (i.e., an original symbol is transmitted, then a permutated symbol of the original symbol is transmitted). In frequency-domain spreading, data is effectively repeated twice (i.e. the same information is placed on both the lower half of the frequencies and the upper half of the frequencies). During the initialization mode, a control signal could increase the data transfer rate by decreasing the order of time-domain spreading and/or frequency-domain spreading from two to one. During the functional mode, a control signal could decrease the data transfer rate by increasing the order of time-domain spreading and/or frequency-domain spreading from one to two.

The output of the constellation mapping block 210 is provided to an Inverse Fast Fourier Transform (IFFT) block 212 which performs an inverse FFT function. The IFFT block 212 may also perform other functions such as inserting pilots, adding cyclic prefixes (CPs), adding zero-padded suffixes (ZPSs) or adding guard intervals (GIs). In at least some embodiments, the IFFT block 212 selectively inserts random data into zero-padded suffixes based on a control signal ("CTL6"). For example, the CTL6 signal may direct the IFFT block 212 to insert random data (zeros, ones, or complex numbers) into zero-padded suffixes during an initialization mode of a host device or a peripheral device that implements the transmitter 200. Also, the CTL6 signal may direct the IFFT block 212 to insert zeros into zero-padded suffixes during a functional mode of a host device or a peripheral device that implements the transmitter 200.

In at least some embodiments, the random data inserted into the zero-padded suffixes can be generated as a specified pseudo-noise (PN) sequence or as the output of an encryption engine that uses a private key. In this manner, a maleficent entity is unable to generate some arbitrary random data and dupe a receiving device.

The output of the IFFT block 212 is received by a digital-to-analog converter (DAC) 214 which converts digital data to an analog signal. The analog signal output from the DAC 214 is provided to a multiplier 216 which multiples the analog signal by a signal "$\exp(j2\pi f_c t)$" from a time-frequency kernel 218. The output of the multiplier 216 is provided to a transmitter power level block 220 that selectively controls a transmission power level based on a control signal ("CTL7"). In at least some embodiments, the CTL7 signal directs the transmitter power level block 220 to decrease the transmission power level during an initialization mode of a host device or a peripheral device that implements the transmitter 200. Also, the CTL7 signal may direct the transmitter power level block 220 to increase the transmission power level during a functional mode of a host device or a peripheral device that implements the transmitter 200. The output of the transmitter power level block 220 is received by an antenna 222 which propagates a wireless signal.

Figure 3:
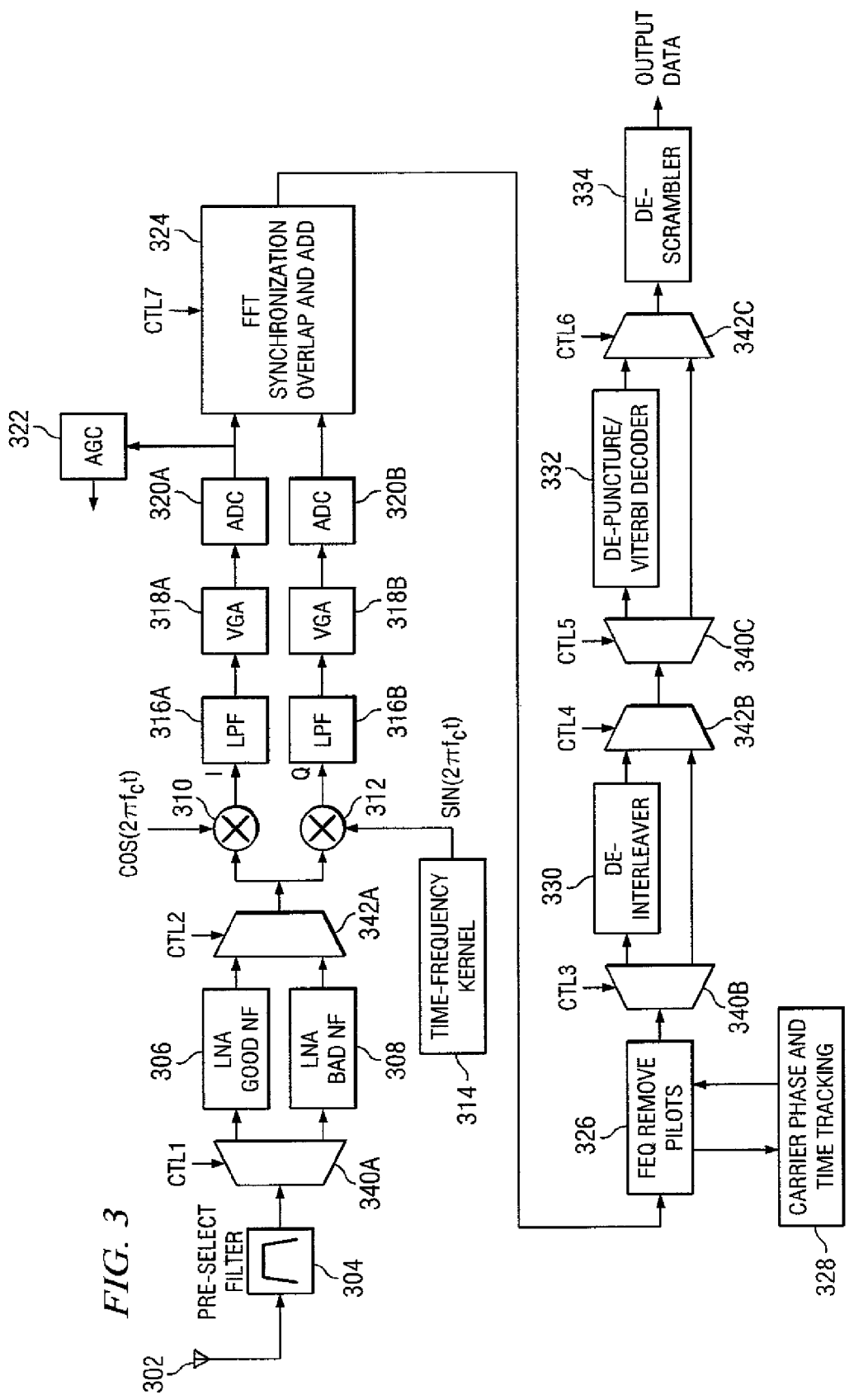
FIG. 3 illustrates a block diagram of a receiver in accordance with embodiments of the disclosure.

FIG. 3 illustrates a receiver 300 in accordance with embodiments of the disclosure. The receiver 300 can be implemented, for example, by the transceivers described previously for the host device 102 and the peripheral device 130. As shown in FIG. 3, the receiver 300 comprises an antenna 302 that receives or "picks up" a wireless signal. The received: signal is input to a pre-select filter 304 which filters the signal and outputs the filtered signal to a mux 340A. The mux 340A either forwards the filtered signal to a Low-Noise Amplifier (LNA) 306 having a first noise factor (NF) or to a LNA 308 having a second NF where the first NF is superior to the second NF. As an example, the first NF may correspond to a 3 to 6 dB NF and the second NF may correspond to a 16 to 28 dB NF. Another mux 242A receives the outputs from the LNA 306 and the LNA 308 and forwards one of these outputs. Accordingly, different quality amplifications provided by the LNA 306 and the LNA 308 can be selected based on the control signals ("CTL1" and "CTL2") for the muxes 340A and 342A. In at least some embodiments, the CTL1 and CTL2 signals direct the muxes 340A and 342A to select the LNA 308 (the lower quality LNA) during an initialization mode of a host device or a peripheral device that implements the receiver 300. Also, the control signals CTL1 and CTL2: may direct the muxes 340A and 342A to select the LNA 306 (the higher quality LNA) during a functional mode of a host device or a peripheral device that implements the receiver 300.

In alternative embodiments, a LNA that is capable of providing both a good NF and a poor NF could be implemented in place of the LNAs 306 and 308. In such case, a control signal could direct the LNA to provide a poor NF during an initialization mode of a host device or a peripheral device that implements the receiver 300. Also, the control signal could direct the LNA to provide a good NF during a functional mode of a host device or a peripheral device that implements the receiver 300.

The output from the mux 342A is provided to two multipliers 310 and 312. The multiplier 310 multiplies the output of the mux 342A by a cosine signal "$\cos(2\pi f_c t)$". The output from the multiplier 310 is input to a low-pass filter (LPF) 316A, then a variable gain amplifier (VGA) 318A, then an analog-to-digital converter (ADC) 320A. The output of the ADC 320A is provided to an amplifier gain control (AGC) block 322 which provides an amplifier gain control signal. In at least some embodiments, this amplifier gain control signal affects the LNAs 306 and 308 and/or the variable gain amplifiers 318A and 318B.

The multiplier 312 (sometimes referred to as a "mixer") multiplies the output of the mux 342A by a sine signal "$\sin(2\pi f_c t)$" provided by a time-frequency kernel 314. The output from the multiplier 312 is input to a low-pass filter (LPF) 316B, then a variable gain amplifier (VGA) 318B, then an analog-to-digital converter (ADC) 320B. The outputs of the ADCs 320A and 320B are provided to a Fast Fourier Transform (FFT) block 324 which performs a FFT function. The FFT block 324 may also perform other functions such as synchronization and overlap-and-add operations. In at least some embodiments, the FFT block 324 receives a control signal ("CTL7") that selectively enables the overlap-and-add operation. For example, the CTL7 signal may disable the overlap-and-add operation during an initialization mode of a host device or a peripheral device that implements the receiver 300. Also, the CTL7 signal may enable the overlap-and-add operation during a functional mode of a host device or a peripheral device that implements the receiver 300.

The output of the FFT block 324 is provided to a frequency equalizer (FEQ) block 326 that performs frequency equalization of the received signal and removes pilots. In at least some embodiments, the FEQ block 326 functions in conjunction with a carrier-phase and time tracking block 328. The output of the FEQ block 328 is provided to a mux 340B that either forwards the received signal to a de-interleaver block 330 or bypasses the de-interleaver block 330. Another mux 342B receives the output from the mux 340B and the output from the de-interleaver block 330 and forwards one of these outputs. Accordingly, the de-interleaving provided by the de-interleaver block 330 can be selectively bypassed based on the control signals ("CTL3" and "CTL4") for the muxes 340B and 342B. In at least some embodiments, the CTL3 and CTL4 signals direct the muxes 340B and 342B to bypass the de-interleaver block 330 during an initialization mode of a host device or a peripheral device that implements the receiver 300. Also, the CTL3 and CTL4 signals may direct the muxes 340B and 342B to utilize the de-interleaver block 330 during a functional mode of a host device or a peripheral device that implements the receiver 300.

The output of the mux 342B is provided to another mux 340C that either forwards the received signal to a de-puncture/decoder block 332 or bypasses the de-puncture/decoder block 332. In at least some embodiments, the de-puncture/decoder block 332 performs forward error correction (FEC) decoding and/or dual-carrier modulation (DCM). For example, FEC could be used for data transfer rates less than or equal to 200 Mbps and DCM could be used for data transfer rates greater than or equal to 320 Mbps. In at least some embodiments, the de-puncture/decoder block 332 may implement a Viterbi decoder. As shown, another mux 342C receives the output from the mux 340C and the output from the de-puncture/decoder block 332 and forwards one of these outputs. Accordingly, the de-puncturing/decoding provided by the de-puncture/decoder block 332 can be selectively bypassed based on the control signals ("CTL5" and "CTL6") for the muxes 340C and 342C. In at least some embodiments, the CTL5 and CTL6 signals direct the muxes 340C and 342C to bypass the de-puncture/decoder block 332 during an initialization mode of a host device or a peripheral device that implements the receiver 300. Also, the CTL5 and CTL6 signals may direct the muxes 340B and 342B to utilize the de-puncture/decoder block 332 during a functional mode of a host device or a peripheral device that implements the receiver 300.

The output of the mux 342C is provided to a de-scrambler 334 which descrambles the received signal. The received signal is then output from the de-scramber 334 for further processing by the recipient device. For example, if the received data is the secret (e.g., during an initialization mode), the recipient device may store the secret in a secure location and acknowledge receipt of the secret to the sender. If the received data is encrypted data (e.g., during a functional mode), the recipient device could decrypt the data based on a secret that was previously received during an initialization mode.

As an example, Table 1 illustrates a "link budget" for an initialization mode. As used herein a link budget refers to a calculation of power and noise levels between a transmitter and receiver.

TABLE 1

| | Parameter | Value |
|---|---|---|
| Add White Gaussian Noise (AWGN) Link Budget | Information Data Rate | 200 Mb/s |
| | Average TX Power | −10.3 dBm |
| | Total Path Loss @20 cm | 30.2 dB |
| | Average RX Power | −40.5 dBm |
| | Noise Power Per Bit | −91.0 dBm |
| | CMOS RX Noise Figure | 6.6 dB |
| | Total Noise Power | −84.4 dBm |
| | Required Eb/N0 (Uncoded) | 9.6 dB |
| | Implementation Loss | 2.5 dB |
| | Link Margin | 31.8 dB |
| | Fading Margin | 3.0 dB |
| | TX Pad (Low Attenuation + 10 dB extra pad) | 22.0 dB |
| | Intercarrier Interference (ICI) Loss Due to Transmitting Random Data In ZPS | x dB |
| | Interleaver Loss | y dB |
| | Final Link Margin | 6.8 − x − y dB (≤0 desired) |

As shown in Table 1, several parameters and values are suggested for determining an appropriate link budget for the initialization mode. The parameters and values represent an approximation and not intended to limit embodiments of the disclosure to any particular set of parameters or values. As shown in FIG. 1, a value is approximated for all parameters except unknown losses due to transmitting random data in the zero-padded suffixes (labeled "x") and losses due to bypassing an interleaver (labeled "y"). Thus, the final link margin is estimated as 6.8−x−y dB where a final link margin that is less than or equal to 0 dB is desired.

While the parameters and values of Table 1 do not necessarily illustrate preferred parameters and values, Table 1 does illustrate that some flexibility is advantageous when configuring a transmitter and receiver to function in the initialization mode. For example, perhaps only the transmitters interleaver should be bypassed and random data need not be inserted into the zero-padded suffixes. Alternatively, perhaps only random data should be inserted into the zero-padded suffixes and bypassing the transmitter's interleaver is not needed.

The goal of the link budget is to achieve a close proximity communication for two devices operating in the initialization mode (i.e., the desired link budget for the initialization mode is approximately 0 dB). In at least some embodiments, selectively adjusting the features of transmitters and receivers such as the transmitter 200 (shown in FIG. 2) and the receiver 300 (shown in FIG. 3) should enable a close proximity initialization mode as is desired.

FIG. 4 illustrates a method 400 in accordance with embodiments of the disclosure. As shown in FIG. 4, the method 400 comprises requesting an association between two devices (block 402). At block 404, the devices exchange a secret or security key during a close proximity communication mode. In at least some embodiments, the close proximity communication mode involves adjusting features of a transmitter (e.g., a Multi-band OFDM transmitter) such as bypassing a convolutional encoder and puncturer, bypassing an interleaver, selecting a puncturer that increases a transmitter's data transfer rate, selecting a constellation mapping that increases a transmitter's data transfer rate, inserting random data into zero padded prefixes at the transmitter, or reducing a transmission power level of the transmitter.

The close proximity communication mode may also involve adjusting features of a receiver (e.g., a Multi-band OFDM receiver) such as selecting a LNA having a poor noise factor, disabling an overlap-and-add operation, bypassing a de-interleaver or bypassing a de-puncturer/decoder. By adjusting the transmitter and receiver features appropriately a desired communication range (e.g., 5-10 cm) can be achieved for secure exchange of the secret during the close proximity communication mode.

At block 406, the devices communicate using the secret during an extended proximity communication mode. In at least some embodiments, the secret enables the devices to participate in a secure session where the secret is used to encrypt/decrypt data transmitted between the two devices. In at least some embodiments, the extended proximity communication mode involves adjusting features of a transmitter (e.g., a Multi-band OFDM transmitter) such as utilizing a convolutional encoder and puncturer, utilizing an interleaver, selecting a puncturer that decreases a transmitter's data transfer rate, selecting a constellation mapping that decreases a transmitter's data transfer rate, inserting zeros into zero padded prefixes at the transmitter, or increasing a transmission power level of the transmitter.

The extended proximity communication mode may also involve adjusting features of a receiver (e.g., a Multi-band OFDM receiver) such as selecting a LNA having a good noise factor, enabling an overlap-and-add operation, utilizing a de-interleaver, or utilizing a de-puncturer/decoder. By adjusting the transmitter and receiver features appropriately a desired communication range (e.g., up to 10 meters) can be achieved for communications during the extended proximity communication mode.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A transmitter comprising:
a physical ("PHY") layer to transmit a wireless signal;
an error correction encoder;
close proximity transmission mode logic to generate a control signal to selectively reduce a transmission range before transmitting an encryption key and to selectively bypass the error correction encoder for a close proximity transmission; and
extended proximity transmission mode logic to configure the transmitter for wireless communication based on a Multi-band orthogonal frequency division multiplexing (OFDM) protocol during an extended proximity communication mode and to generate a control signal to selectively utilize the error correction encoder for an extended proximity transmission.

2. A transmitter comprising:
a physical ("PHY") layer to transmit a wireless signal;
an interleaver;
close proximity transmission mode logic to generate a control signal to selectively reduce a transmission range before transmitting an encryption key and to selectively bypass the interleaver for a close proximity transmission; and
extended proximity transmission mode logic to configure the transmitter for wireless communication based on a Multi-band orthogonal frequency division multiplexing (OFDM) protocol during an extended proximity communication mode and to generate a control signal to selectively utilize the interleaver for an extended proximity transmission.

3. A transmitter comprising:
a physical ("PHY") layer to transmit a wireless signal;
Inverse Fast Fourier Transform (IFFT) logic;
close proximity transmission mode logic to generate a control signal to selectively reduce a transmission range before transmitting an encryption key and to selectively direct the IFFT logic to insert random data into zero-padded suffixes for a close proximity transmission; and
extended proximity transmission mode logic to configure the transmitter for wireless communication based on a Multi-band orthogonal frequency division multiplexing (OFDM) protocol during an extended proximity communication mode and to generate a control signal to selectively direct the IFFT logic to insert zeros into zero-padded suffixes for an extended proximity transmission.

4. A receiver comprising:
a physical ("PHY") layer to receive a wireless signal;
close proximity communication mode logic to generate a control signal to selectively bypass an error correction decoder to receive a close proximity transmission; and
extended proximity communication mode logic to configure the receiver for wireless communication based on a Multi-band orthogonal frequency division multiplexing (OFDM) protocol during an extended proximity communication mode and to generate a control signal to selectively utilize the error correction decoder to receive an extended proximity transmission.

5. A receiver comprising:
a physical ("PHY") layer to receive a wireless signal;
close proximity communication mode logic to generate a control signal to selectively bypass a de-interleaver to receive a close proximity transmission; and
extended proximity communication mode logic to configure the receiver for wireless communication based on a Multi-band orthogonal frequency division multiplexing (OFDM) protocol during an extended proximity communication mode and to generate a control signal to selectively utilize the de-interleaver to receive an extended proximity transmission.

6. A receiver used in a communications channel, said receiver comprising:
a physical ("PHY") layer to receive a wireless signal;
close proximity communication mode logic to generate a control signal to selectively disable an overlap-and-add logic of the receiver to receive a close proximity transmission, wherein the communications channel looks like an impulse; and
extended proximity communication mode logic for configuring the receiver for wireless communication based on a Multi-band orthogonal frequency division multiplexing (OFDM) protocol during an extended proximity communication mode and to generate a control signal to selectively utilize the overlap-and-add logic to receive an extended proximity transmission.

* * * * *